Feb. 3, 1959   C. C. SMITH   2,871,540
FISH LINE CONNECTOR
Filed March 8, 1954
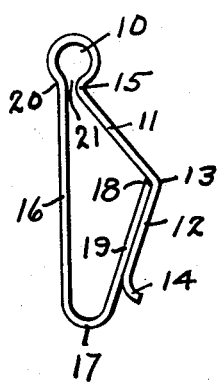
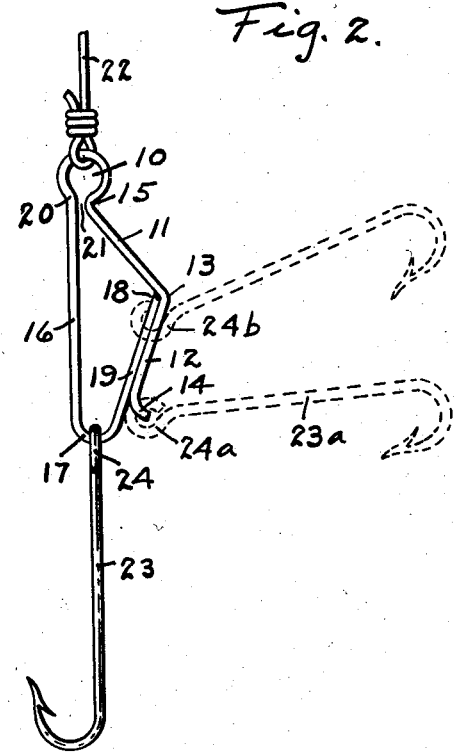
INVENTOR
CHARLES C. SMITH,
By Herbert A. Minturn,
ATTORNEY

2,871,540

FISH LINE CONNECTOR

Charles C. Smith, Indianapolis, Ind.

Application March 8, 1954, Serial No. 414,599

1 Claim. (Cl. 24—237)

This invention relates to a device permitting quick attachment and detachment of artificial baits and fish hooks or the like to a fish line, and consists primarily of a one piece spring wire in the nature of a clip or clasp so formed and shaped that when the eye of the bait or of the hook to be engaged therewith has been placed on the device, there are no shoulders or exposed lengths of an opening clasp wire or member against which the eye may bear tending to open the device.

A primary object of the invention is to provide a structure of the type above indicated which will be more effective in respect to devices heretofore known in retaining the eye of the bait or hook in position and against detachment accidently from the connector. In the devices heretofore known, without exception, they have afforded lengths whereby the leverage of a twisting bait eye or hook will tend to cause that member to become detached from the connector with the resultant loss of bait. Not only is there the possibility of the loss of the bait, but also the loss of the fish once hooked.

My invention has a further advantage in that it is exceedingly simple to make, and to be used in actual practice, and yet it cures the defect found in these prior devices known to me. These and many other objects and advantages of the invention will become apparent to those versed in the art in the following description of the invention which is made in connection with the accompanying drawing, in which Fig. 1 is a view in side elevation of the structure embodying the invention; and Fig. 2 is a view also in side elevation with the line and a fish hook attached thereto.

A single piece of spring wire is formed to have an eye 10, herein shown as generally circular in shape. From one side of this eye there extends diagonally downwardly and outwardly a leg 11 from which there is bent downwardly and inwardly an arm 12 at an obtuse angle at the bend 13. The arm 12 terminates by an outturned end 14. From the other side of the eye 10, adjacent to the bend 15 from which the leg 11 extends, there is carried downwardly a length 16 of the wire in a straight line manner, and this straight length then goes into a bend 17 below the end 14. The wire continues around upwardly and outwardly to bend 17 to lie in yielding contact along the arm 12 entirely up to the bend 13, so that the end 18 of this up and outturned length 19 lies substantially against the leg 11.

The straight length 16 leaves the eye 10 at the bend 20 which is adjacent to the bend 15 on the opposite side, making no particular difference if there is a slight clearance 21 between those bends, although it is preferable that the two bends approach one another in the manner indicated in Figs. 1 and 2. A line 22 may be attached either through a swivel (not shown) or directly tied to the device by engagement around the wire through the eye 10. Of course, as is well known in the practice of fishermen, a leader may be interposed between the line 22 and the eye 10 if so desired. Either a bait having an eye or a fish hook 23 may be engaged by an eye 24 and thus interconnected with the line 22. To begin with, a fish hook in the position 23a has its eye 24a brought up to receive the wire end 14 therethrough and then the eye is carried on up along the arm 12 to slide yieldingly between it and the length 19 until the eye reaches the bend 13 whereupon it is carried up the length 11 to permit the end 18 to snap back against the arm 12 at its bend 13. Then the eye 24 is carried down through the position 24b so that it can slide on down and over the arm 12 and length 19 over the outturned end 14 to bring it down and into the bend 17 as indicated in Fig. 2. The diameter of the wire forming the device is such that when the two members 12 and 19 are in engagement longitudinally one along the other, the eye is sufficiently large in respect to its opening to permit the eye to come down into the bend 17.

Now should the hook 23 be swung to the side for any particular reason, particularly in an attempt to land a fish, the eye does not at any time ever come into contact with the arm 12 bearing along the length 19 even up to the bend 13, the eye riding across the end 18 and actually bearing against the leg 11 if it travels that far up. In other words the eye does not again come into contact with the arm 12 tending to spring it away from the member 19. To the contrary, the action is to urge the length 19 compressibly against the arm 12 throughout its length. This action is highly important in the operation of the device. The arm 12 and the member 19 are initially compressibly engaged and they remain so, this engagement continuing throughout their contacting lengths from the bend 13 down to the outturned end 14. While the device is entirely operative and most effective when the wire is round in cross-section, its effectiveness is increased by using a rectangular cross-section wire so that there are flat surfaces bearing one against the other along the members 12 and 19. The device of course may be made in various sizes and as the size increases, the importance of the longitudinal contact of the lengths 12 and 19 up to the bend 13 increases.

Thus it is to be seen that the device is operated in the absence of any "safety pin clasp" and while I have shown and described the invention in the one particular form, it is obvious that structural changes may be employed without departing from the spirit of the invention, and I therefore do not desire to be limited to that precise form beyond the limitations which may be imposed in the following claim.

I claim:

A fish line hook connector engageable with the eyelet of a hook and comprising a single piece of wire having an upper bend defining substantially a line attaching eye; a straight length of said wire extending from the eye into a lowermost V-bend and extending acutely from the bend by a second straight length terminating by an end intermediate said eye and said lower bend and spaced laterally from said first straight length; said wire extending by a leg in a straight line from said line eye diagonally downwardly therefrom and outwardly from said first straight length over and into contact with said end and thence through an obtuse angle bend downwardly by an arm extending in parallelism with and along the outside in compressive, yielding contact with approximately the entire length of said second straight length and terminating in an outturned end adjacent said V-bend; said wire lengths, bends, arm, leg, and ends lying in a common plane; whereby said connector and said hook may be engaged by entering said outturned end through the hook eyelet, forcing the hook eyelet along said arm passing therethrough, yieldingly spacing apart the arm and said second wire length and lifting said leg from against said second length end, moving the eyelet along the leg to clear said length end to allow the arm and second length to spring back to longitudinal contact with and to cover over the length end, moving the eyelet back along both the arm and the second length with both passing through the eyelet, including said outturned end, to bring the hook eyelet finally to said V-bend from which the hook hangs normally; and whereby said connector and said hook may be disengaged by sliding said hook eyelet from the V-bend to have a side of the hook eyelet abut said outturned end and pass between said arm and said second length with the second length only then extending through the wire, and moving the hook eyelet along the second length to and beyond said outturned end.

References Cited in the file of this patent

UNITED STATES PATENTS

| | | |
|---|---|---|
| 843,226 | Moore | Feb. 5, 1907 |
| 1,728,560 | Goshorn | Sept. 17, 1929 |
| 2,304,967 | Tiryakian | Dec. 15, 1942 |

FOREIGN PATENTS

| | | |
|---|---|---|
| 899,289 | France | Aug. 7, 1944 |